United States Patent
Goal et al.

(10) Patent No.: US 7,523,318 B2
(45) Date of Patent: Apr. 21, 2009

(54) METHOD AND SYSTEM FOR AUTOMATED PASSWORD GENERATION

(75) Inventors: Patrick M. Goal, Austin, TX (US); Steven Jay Kriese, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 10/371,001

(22) Filed: Feb. 20, 2003

(65) Prior Publication Data

US 2004/0168068 A1 Aug. 26, 2004

(51) Int. Cl.
*H04L 9/00* (2006.01)

(52) U.S. Cl. .................. 713/184; 713/165; 713/183; 713/186; 726/5; 726/26

(58) Field of Classification Search .............. 713/184, 713/183, 165, 186; 726/26, 5, 14
See application file for complete search history.

(56) References Cited

U.S. PATENT DOCUMENTS

| | | | | |
|---|---|---|---|---|
| 5,060,263 | A * | 10/1991 | Bosen et al. | 713/184 |
| 5,588,056 | A * | 12/1996 | Ganesan | 713/183 |
| 5,944,825 | A * | 8/1999 | Bellemore et al. | 726/18 |
| 5,991,882 | A * | 11/1999 | O'Connell | 726/18 |
| 6,148,406 | A * | 11/2000 | Weisz et al. | 726/18 |
| 6,643,784 | B1 * | 11/2003 | McCulligh | 726/18 |
| 6,980,081 | B2 * | 12/2005 | Anderson | 340/5.53 |
| 7,069,584 | B1 * | 6/2006 | Davis | 726/5 |
| 7,249,261 | B2 * | 7/2007 | Charbonneau | 713/184 |
| 2002/0083347 | A1 * | 6/2002 | Taguchi | 713/202 |
| 2003/0005299 | A1 * | 1/2003 | Xia et al. | 713/171 |
| 2003/0070774 | A1 * | 4/2003 | Geller et al. | 713/168 |
| 2003/0172281 | A1 * | 9/2003 | Lee | 713/183 |
| 2003/0229791 | A1 * | 12/2003 | De Jong | 713/182 |
| 2005/0044425 | A1 * | 2/2005 | Hypponen | 713/202 |

OTHER PUBLICATIONS

Mirzazhanov, APGOnline, 2001, pp. 1-2.*
Mirzazhanov, APG (Automated Password Generator), 2002, pp. 1-2.*
Hughes, User-Centric Account Management and Heterogeneous Password Changing, 2000, pp. 67-76.*
FIPS 181- (APG) Automated Password Generator, 1993, pp. 1-9.*

* cited by examiner

*Primary Examiner*—Carl Colin
*Assistant Examiner*—Shanto M Abedin
(74) *Attorney, Agent, or Firm*—Diana R. Gerhardt; Dillon & Yudell LLP

(57) ABSTRACT

Access to target data processing systems frequently requires a password to be submitted in conjunction with user identification. The required rules and syntax for such passwords may vary widely from system-to-system and the number and variety of systems makes password management difficult. An analysis of an initially assigned or known valid password is performed, and the nature of each character within the password is defined, i.e., a numeric character, a punctuation character, a lower-case alphabetic character, or an upper-case alphabetic character. Randomly generated characters of identical nature are then assigned to each position within the password to create a new password, which will comply with the specified rules and syntax for a particular target data processing system.

8 Claims, 4 Drawing Sheets

METHOD AND SYSTEM FOR AUTOMATED PASSWORD GENERATION

BACKGROUND OF THE INVENTION

1. Technical Field

The present invention relates in general to data processing system security, and in particular, to a method and system for automatic password generation. Still more particularly, the present invention relates to a method and system for automatic password generation, which will automatically comply with required password rules and syntax for any of multiple systems.

2. Description of the Related Art

Computer communication utilizing various networks, such as the Internet, has become increasingly popular. Security within such networks is typically accomplished by associating a particular password with a particular user and submission of an identification of that user and the appropriate password are required in order to permit access to a target data processing system.

Different target data processing systems frequently specify the rules and syntax which must be utilized for a password. For example, passwords may be specified as containing at least six characters and no more than twelve characters. The characters themselves may be required to be a non-repetitive string of alphanumeric characters and further requirements may exist which specify the intermix of alphabetic characters and numeric characters.

The number of systems requiring a password for access and the wide variety of password rules and syntax make it difficult for a user to spontaneously generate a new password which complies with the rules and syntax for a particular system.

Consequently, it would be desirable to provide a method and system for automated password generation, which has a high likelihood of complying with required password rules and syntax for each of multiple data processing systems.

SUMMARY OF THE INVENTION

It is therefore one object of the present invention to provide an improved system for data processing system security.

It is another object of the present invention to provide an improved method and system for automatic password generation.

It is yet another object of the present invention to provide an improved method and system for automatic password generation, which will automatically comply with, required password rules and syntax for multiple diverse systems.

The foregoing objects are achieved as is now described. The required rules and syntax for passwords utilized to access various target data processing systems will vary from system to system. Further, the number and variety of such systems make password management difficult. An analysis of an initially assigned, or known valid password, is performed and the nature of each character within the password is determined, i.e., a numeric character, a punctuation character, a lower-case alphabetic character, or an upper-case alphabetic character. Randomly generated characters of identical nature are then assigned to each position within the password string to create a new password, which will comply with the specified rules for a particular target system.

BRIEF DESCRIPTION OF THE DRAWINGS

The novel features believed characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
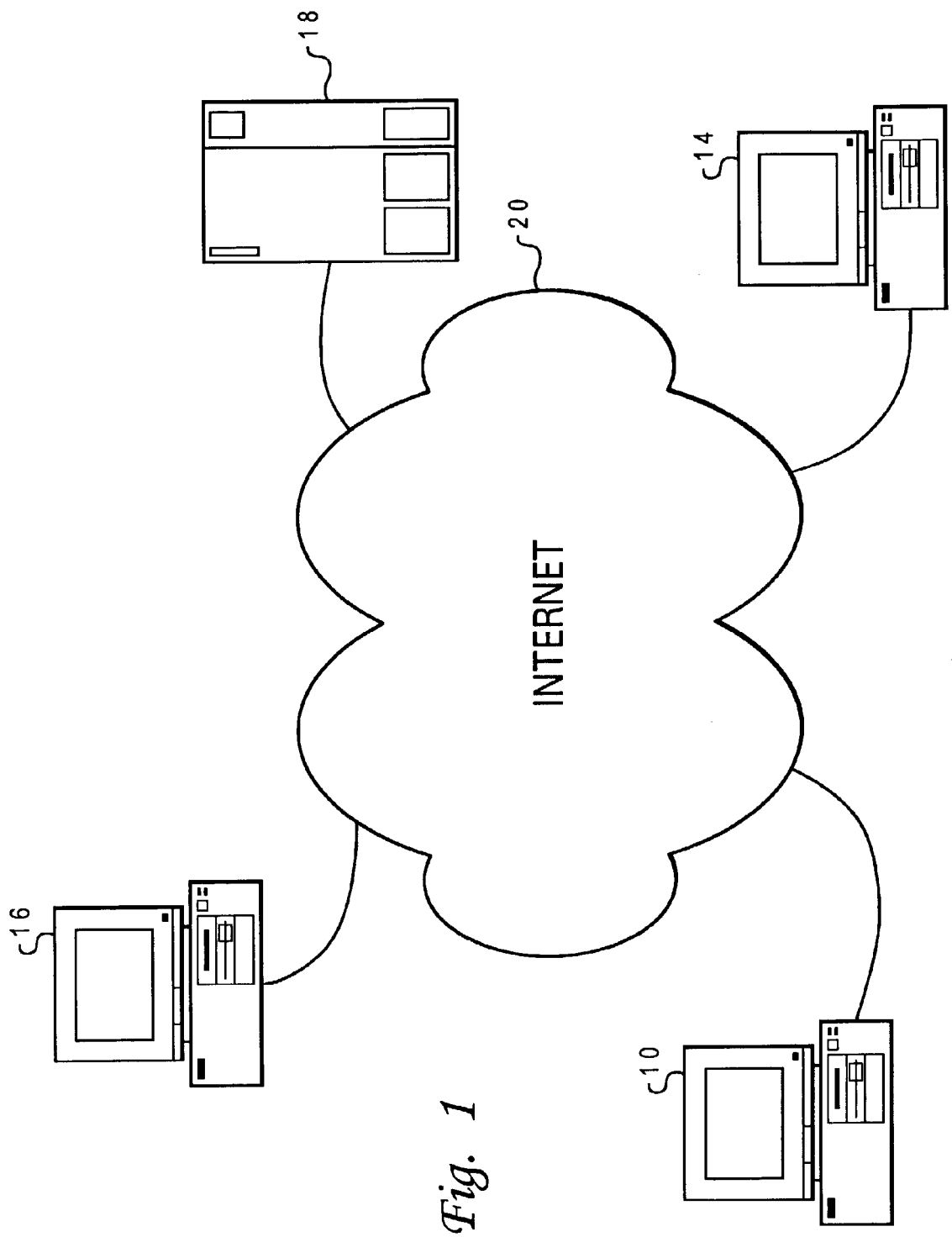
FIG. 1 is a schematic representation of a plurality of data processing systems linked together over a network, within which the method and system of the present invention may find application.

With reference now to the Figures and in particular with reference to FIG. 1, there is depicted a schematic representation of a plurality of data processing systems linked together over a network, within which the method and system of the present invention may find application. As illustrated, data processing systems 10, 14, 16 and 18 are linked together via any network over which communication may occur. In the depicted embodiment within FIG. 1, the Internet 20 is the method by which such communication takes place. As illustrated, data processing systems 10, 14, 16 and 18, may be implemented utilizing a so-called "personal" computer such as the Aptiva series personal computer manufactured by International Business Machines of Armonk, N.Y. Similarly, data processing system 18 may be implemented utilizing a mid-level computer, server or workstation device. In a typical network of the type depicted, many thousands of computers, servers, workstations, or the like, may be linked.

Thus, as depicted within FIG. 1, multiple data processing systems may be linked together and communication between those data processing systems may be limited to those individuals possessing the appropriate user identification and password, which permits access to files, accounts, or data stored within another data processing system.

Figure 2:
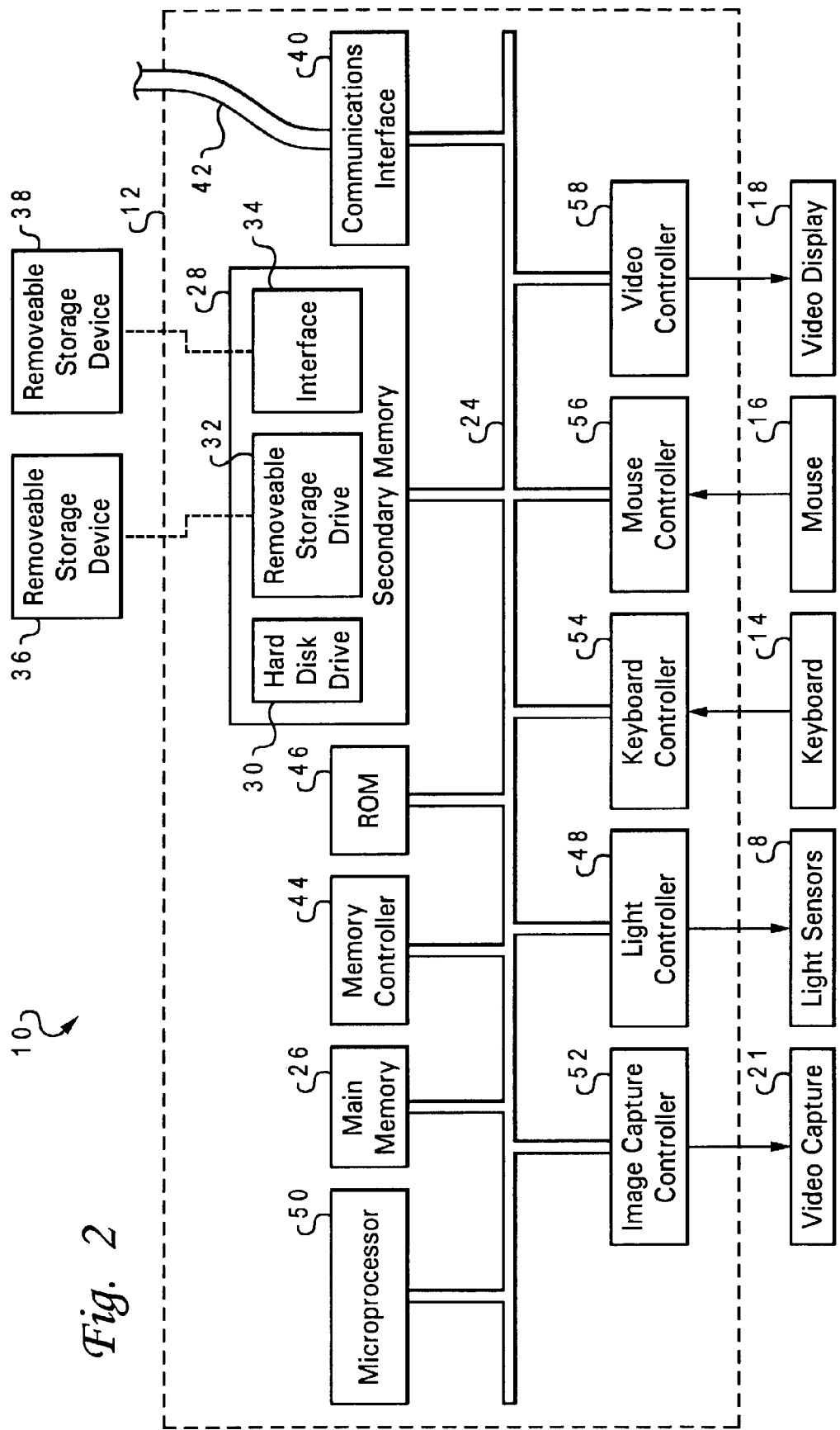
FIG. 2 is a high-level block diagram of one of the data processing systems of FIG. 1 which may be utilized to implement the method and system of the present invention.

Referring now to FIG. 2, there is depicted a data processing system environment for implementing the present invention. The environment is a processor unit 12 within data processing system 10 that includes one or more processors such as microprocessor 50. Microprocessor 50 is connected to a system bus 24. Various software embodiments are described in terms of this example data processing system. After reading the description, it will be apparent to a person skilled in the relevant art how to implement the invention using other data processing systems and/or data processing system architectures.

Processor unit 12 also includes a main memory 26, which preferably comprises random access memory (RAM). In addition, a secondary memory 28 may be included. Secondary memory 28 may include, for example, a hard disk drive 30, a removable storage drive 32, and an interface 34. Removable storage drive may represent a floppy disk drive, magnetic tape drive, an optical disc drive, or other data drive, which reads and writes to a removable storage unit 36. Removable storage unit 36 represents a floppy disk, magnetic tape, optical disk, or any other data storage device, which is read by and written to by removable storage drive 32. As will be appreciated, removable storage unit 36 includes a computer usable storage medium having stored therein computer software and/or data.

In alternative embodiments, secondary memory 28 may include other similar means for allowing computer programs, or other instructions to be loaded into processor unit 12. Such means may include, for example, a removable storage unit 38 and interface 34. Examples may include a program cartridge and cartridge interface, a removable chip (such as EEPROM, PROM, or PCMCIA) and associated socket, and other removable storage units 38 and interfaces 34 which allow software and data to be transferred from removable storage unit 28 to data processing system 10.

Data processing system 10 preferably includes a memory controller 44, connected to system bus 24, for controlling all Direct Memory Access (DMA) operations such as paging data between main memory 26 and secondary memory 28. In addition, random access memory (ROM) 46 contains, amount other code, the Basic Input/Output System (BIOS) or other firmware which controls certain basic hardware operations, such as interactions of hard disk drive 30 and removable storage drive 32.

Data processing system 10 may also include a communications interface 40. Communications interface 40 allows software and data to be transferred between data processing system 10 and external devices via communications path 42. Examples of communications interface 40 include a modem, printer, communications port, and other communications supporting hardware. A modem allows data processing system 10 to communicate with other data processing systems over the Internet through a communications path including but not limited to public switched telephone network (PSTN) or ISDN lines. Software and data transferred via communications interface 40 are in the form of signals that can be electronic, electromagnetic, optical, or other signals capable of being received or sent by communications interface 40 via communications path 42. In particular, communications interface 40 provides a means by which data processing system 10 may interface a network such as Internet 20.

Within data processing system 10, there are five additional input/output (I/O) controllers, namely, light controller 48, image capture controller 52, keyboard controller 58, all of which are connected to system bus 24. As their names imply, light controller 48 provides the hardware interface for light sensors 8 and image capture controller 52, keyboard controller 54, mouse controller 56 and video controller 58, all of which are connected to system bus 24. As their names imply, light controller 48 provides the hardware interface for light sensors 8 and image capture controller 52 provides the hardware interface for video capture device 21. Further, keyboard 14, mouse controller 56 provides the hardware interface for mouse 16, and video controller 58 provides the hardware interface for video display 18.

The present invention is preferably implemented utilizing software executing in a data processing system environment similar to that described above with respect to FIG. 2. Thus, the term "computer program product" is used to generally refer to a program stored at removable storage drive 32 or hard disk installed in hard disk drive 30. These computer program products are means for providing software to data processing system 10.

Computer programs or computer control logic are stored in main memory 26 and/or secondary memory 28. Computer programs can also be received via communications interface 40. Such computer programs, when executed, enable data processing system 10 to perform the features of the present invention as discussed herein. In particular, the computer programs, when executed, enable microprocessor 22 to perform the features of the present invention. Accordingly, such computer programs represent controllers of data processing system 10.

Figure 3:
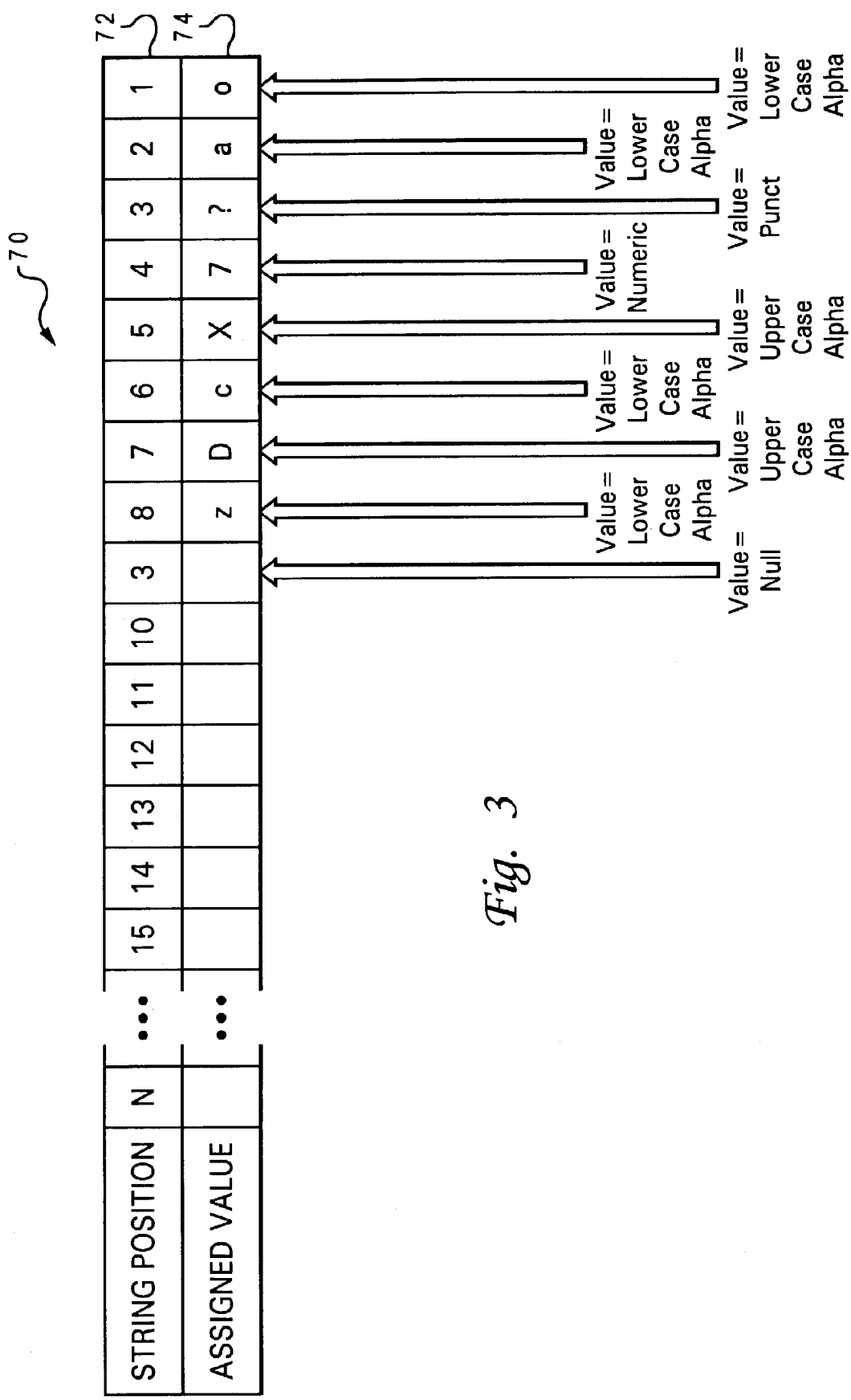
FIG. 3 is a pictorial representation of a table which may be utilized to automatically generate a password in accordance with the method and system of the present invention.

With reference now to FIG. 3, there is depicted a pictorial representation of a table 70 which may be utilized to automatically generate a password in accordance with the method and system of the present invention. As depicted, table 70 includes two rows, 72 and 74. Row 72 is utilized to designate each string position within a multi-character password string. As depicted, any number of characters may be accommodated by simply providing a table of sufficient dimension.

Next, as depicted at row 74, an initially assigned or known valid password value is entered. Each string position within the multi-character password string, which is utilized for access to target data processing system, is entered into row 74 in a column directly below the designation of the string position for that particular character. Thus, the initially assigned or known valid password for a particular target data processing system, as set forth within the example of FIG. 3 is "zDcX7?ao". As illustrated, each character is assigned a position within row 74 below the string position associated with that character.

Next, an analysis is performed of each character within the multiple character passwords for a target data processing system to determine the nature of the character at a particular string position. That is, whether the character is a lower-case alphabetic character, an upper-case alphabetic character, a punctuation mark, or a numeric value. A template may then be created in which the specified nature of each character within the initially assigned or known valid password is determined and, in a manner which will be explained in greater detail below, alternate passwords may be automatically generated which will clearly comply with the rules and syntax for the target data processing system.

Figure 4:
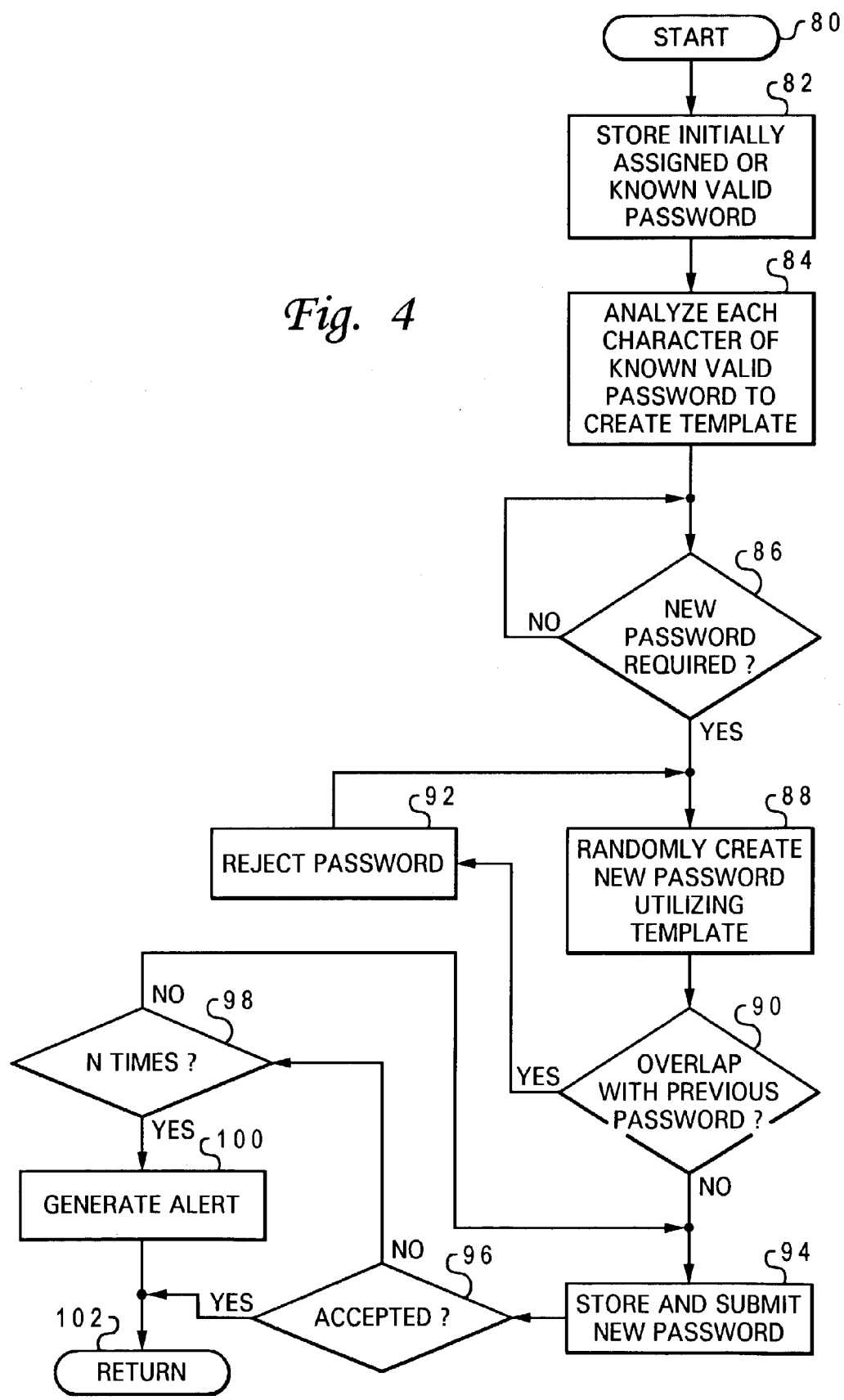
FIG. 4 is a high-level logic flow chart illustrating one method for implementing the present invention.

Referring now to FIG. 4 there is illustrated a high-level logic flow chart, which depicts a method for implementing the present invention, as illustrated within FIG. 3. As depicted, this process begins at block 80 and thereafter passes to block 82. Block 82 illustrates the storing of an initially assigned or known valid password for a particular target data processing system. Next, the process passes to block 84.

Block 84 illustrates the analysis of each character within the initially assigned or known valid password for that target data processing system to create a template. This analysis may be accomplished utilizing any suitable technique; however, the table illustrated within FIG. 3 is a particularly useful method for accomplishing this analysis.

Thereafter, the process passes to block 86. Block 86 depicts a determination of whether or not a new password is required for that target data processing system and if not, the process merely iterates until such time as a new password has been required.

Next, still referring to block 86, in the event a new password has been required, the process passes to block 88. Block 88 illustrates the random creation of a new password utilizing the template which was created by the analysis of the initially assigned or known valid password. The process then passes to block 90. Block 90 depicts a determination of whether or not there is overlap of selected characters between the randomly created new password and a previous password, which is stored within the system. Those having ordinary skill in this art will appreciate that an overlap of less than a specified number of characters may be permitted by the rules and syntax for password generation in the target data processing system, and this block merely illustrates a determination of whether or not the randomly created new password complies with such requirement.

In the event there is too much overlap between the randomly created password and a previous password, the process passes to block 92. Block 92 illustrates the rejection of the randomly created password and the process returns, in an iterative fashion, to block 88, where a new password is once again randomly created and thereafter tested, as described above.

Still referring to block 90, in the event no disqualifying overlap exists between the randomly created new password and a previous password, the process passes to block 94. Block 94 illustrates the storing of the newly created password and submission of that password to the target data processing system. Preferably, the stored passwords and the templates created for each target data processing system are kept in secure storage, accessible by the user only upon entry of a mater password. Thereafter, the process passes to block 96.

Block 96 illustrates a determination of whether or not the newly created password has been accepted by the target data processing system and if not, the process passes to block 98. Block 98 illustrates a determination of whether the newly created password has been rejected "N" times, a number "N" which may be selected by the user in the depicted embodiment of the present invention. If not, the process returns to block 94 where the newly created password is once again submitted.

Referring again to block 98, in the event the newly created password has been rejected by the target data process system "N" times, the process passes from block 98 to block 100. Block 100 illustrates the generation of an alert to the user of the data processing system so that a password may be manually generated and submitted prior to the target data processing system prohibiting further accesses by this user. Thereafter, or after the password has been accepted by the target data processing system, the process passes to block 102 and returns.

Upon reference to the foregoing, those skilled in the art will appreciate that the inventor's of the present application have created a new method and system whereby an analysis of an initially assigned or known valid password may be utilized to create a template which may thereafter be utilized to automatically and randomly create new passwords which should comply with the rules and syntax required for a particular target data processing system, with minimal user intervention. In this manner, the likelihood of password problems is greatly diminished. Further, by storing the passwords and the templates utilized to create those passwords within secure storage, accessible by the user utilizing a master password, the management and security of the password system is greatly enhanced. Indeed, it is possible that with this system, the user need not even be aware of the current passwords utilized to access a target data processing system, ensuring that the passwords will not inadvertently fall into the hands of an unauthorized user.

While the invention has been particularly shown and described with reference to a preferred embodiment, it will be understood by those skilled in the art that various changes in form and detail may be made therein without departing from the spirit and scope of the invention.

What is claimed is:

1. A method for automated password generation in a data processing system, said method comprising the steps of:
   storing a known valid assigned multi-character password string for a target data processing system;
   automatically determining a character type for each character in said known valid multi-character password string;
   automatically assigning a random character of identical type to replace each character in said known valid multi-character password string to create a randomly generated password, which will comply with specified password rules, and syntax for said target data processing system;
   submitting said randomly generated password to said target data processing system; and
   generating an alert message to a user of said data processing system in the event said randomly generated password is rejected by said target data processing system "N" times wherein "N" is a user defined number.

2. The method for automated password generation in a data processing system according to claim 1, further including the step of storing a copy of each randomly generated password within said data processing system.

3. The method for automated password generation in a data processing system according to claim 1, further including the step of comparing each randomly generated password with previously stored copies of randomly generated passwords to eliminate duplication.

4. The method for automated password generation in a data processing system according to claim 1, wherein said step of automatically determining a character type for each character in said known valid multi-character password further comprising the step of automatically determining whether each character in said known valid multi-character password is a numeric character, a punctuation character, a lower-case alphabetic character, or an upper-case alphabetic character.

5. A system for automated password generation, said system comprising:
   memory for storing a known valid multi-character password string for a target data processing system;
   means for automatically determining a character type for each character in said known valid multi-character password string;
   means for automatically assigning a random character of identical type to replace each character in said known valid multi-character password string to create a randomly generated password, which will comply with specified password rules, and syntax for said target data processing system;
   means for submitting said randomly generated password to said target data processing system; and
   means for generating an alert message in the event said randomly generated password is rejected by said target data proceeding system "N" times; and
   means for permitting a user to define "N".

6. The system for automated password generation in a data processing system according to claim 5, further including means for storing a copy of each randomly generated password within said memory.

7. The system for automated password generation in a data processing system according to claim 6, further including means for comparing each randomly generated password with previously stored copies of randomly generated passwords to eliminate duplication.

8. The system for automated password generation in a data processing system according to claim 5, wherein said means for automatically determining a character type for each character in said known valid multi-character password string comprises means for automatically determining whether each character in said known valid multi-character password string is a numeric character, a punctuation character, a lower-case alphabetic character, or an upper-case alphabetic character.

\* \* \* \* \*